US010949162B2

(12) United States Patent
Xia et al.

(10) Patent No.: US 10,949,162 B2
(45) Date of Patent: Mar. 16, 2021

(54) METHOD FOR MULTI-CHANNEL RECORDING BASED ON ANDROID SYSTEM AND AUDIO SYSTEM

(71) Applicant: AMLOGIC (SHANGHAI) CO., LTD., Shanghai (CN)

(72) Inventors: Jinlin Xia, Shanghai (CN); Zeyun Gong, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/385,689

(22) PCT Filed: Oct. 31, 2018

(86) PCT No.: PCT/CN2018/113142
§ 371 (c)(1),
(2) Date: Apr. 16, 2019

(87) PCT Pub. No.: WO2019/109763
PCT Pub. Date: Jun. 13, 2019

(65) Prior Publication Data
US 2020/0293264 A1    Sep. 17, 2020

(30) Foreign Application Priority Data

Dec. 6, 2017  (CN) .......................... 201711278613.1

(51) Int. Cl.
*G06F 3/16*        (2006.01)
*G06F 16/11*       (2019.01)

(52) U.S. Cl.
CPC ............ *G06F 3/162* (2013.01); *G06F 16/116* (2019.01)

(58) Field of Classification Search
CPC .......... G06F 3/162; G06F 16/116; G06F 8/24; G06F 3/16; G06F 9/4411; G06F 3/165
See application file for complete search history.

(56) References Cited

FOREIGN PATENT DOCUMENTS

| CN | 105261385 A | * | 1/2016 | |
|---|---|---|---|---|
| CN | 105895111 A | | 8/2016 | |
| CN | 107301035 A | * | 10/2017 | ............... G06F 9/44 |
| CN | 107301035 A | | 10/2017 | |

* cited by examiner

*Primary Examiner* — Yogeshkumar Patel
(74) *Attorney, Agent, or Firm* — Umberg Zipser LLP

(57) ABSTRACT

The invention provides a method for realizing multi-channel recording based on an Android system and an audio system, wherein the audio system sequentially comprises a recording application module, an audio framework module, an audio library, a hardware abstraction module and an audio driver module in a kernel, wherein the method comprises: the hardware abstraction module calling an audio recording interface, so that the audio framework executes a multi-channel recording operation through the audio interface; the audio framework module being configured to support a multi-channel recording function; and the recording application module being configured to support transmission of multi-channel recording parameters. The requirement of a user for achieving the multi-track recording function in the Android system can be met, and the defect that in the prior art, the intelligent device, based on the Android system only supports a single-channel or double-channel recording function is overcome.

12 Claims, 1 Drawing Sheet

US 10,949,162 B2

METHOD FOR MULTI-CHANNEL RECORDING BASED ON ANDROID SYSTEM AND AUDIO SYSTEM

CROSS-REFERENCE TO RELATED APPLICATIONS

The present application is a national phase of Ser. No. PCT/CN2018/113142 filed Oct. 31, 2018, the entire contents of which are incorporated herein by reference, and which claims priority to and the benefit of Chinese Patent Application No. 201711278613.1 filed Dec. 6, 2017.

BACKGROUND OF THE INVENTION

1. Field of the Invention

The invention relates to the field of communication technologies, and more particularly, to a method for realizing multi-channel recording based on an Android system and an audio system.

2. Description of the Related Art

Android, an operating system based on Linux with open source code, is generally provided with an audio recording function. When performing an audio recording operation, an audio record, a standard interface of the Android, is called for audio recording. Also, the Android system provides some related applications for realizing the audio recording function. The Android system is designed primarily for mobile terminals, such as mobile phones and tablets. While the smart phones usually have 1 or 2 microphones, such that the audio recording function only supports a single channel or double channels, that is, the number of channels exceeding 2 is not supported. Accordingly, it is in an urgent need of a method for achieving the multi-channel (i.e., more than 2 channels) recording function in the Android system, meeting users' requirement.

SUMMARY OF THE INVENTION

In view of the foregoing problems occurring in achieving multi-channel recording function in the Android system in the prior art, the present invention provides a method for realizing multi-channel recording in the Android system and an audio system, through which the requirement of a user for achieving the multi-track recording function in the Android system can be met.

The technical solution is as follows:

A method for realizing multi-channel recording based on an Android system, which is applicable to an audio system of an intelligent device based on the Android system, wherein the audio system sequentially comprises a recording application module, an audio framework module, an audio library, a hardware abstraction module and an audio driver module in a kernel, wherein the method comprises following steps of:

Step S1, the hardware abstraction module calling an audio recording interface, so that the audio framework executes a multi-channel recording operation through the audio interface;

Step S2, the audio framework module being configured to support a multi-channel recording function; and Step S3, the recording application module being configured to support transmission of multi-channel recording parameters.

Preferably, the audio framework module comprises a parameter configuration file, wherein in Step S2, a method for configuring the audio framework module comprises following steps of:

Step S21, adding a multi-channel processing sub-module to the parameter configuration file;

Step S22, in the configuration file, channel number support parameters being configured to support the multi-channel; and Step S23, in the configuration file, processing channel number being configured to support processing the multi-channel; wherein the configured parameter configuration file is available for the audio framework module to support the multi-channel recording operation.

Preferably, the audio framework module comprises a hardware configuration file, and multi-channel configuration parameters are added to the hardware configuration file;

the configured hardware configuration file is available for a hardware device to support the multi-channel recording, so as to obtain multi-channel recording parameters.

Preferably, the hardware configuration file is a configuration file of a main sound card.

Preferably, the recording application module comprises an application configuration file, wherein in the application configuration file, the number for transmitting channel parameters is configured to support transmitting the multi-channel, and the configured application configuration file is available for the recording application module to support the multi-channel recording parameters obtained through transmission.

Preferably, in the application configuration file, a recording file in a predetermined format is created, and the recording file in a predetermined format is configured with multi-channel transmission parameters.

Preferably, the multi-channel comprises 8 channels.

An audio system is also provided, wherein the audio system is applicable to the above-mentioned method for realizing multi-channel recording.

The technical scheme has the advantages that the requirement of a user for achieving the multi-track recording function in the Android system can be met, and the defect that in the prior art, the intelligent device, such as mobile phones and tablets, based on the Android system only supports a single-channel or double-channel recording function is overcome.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
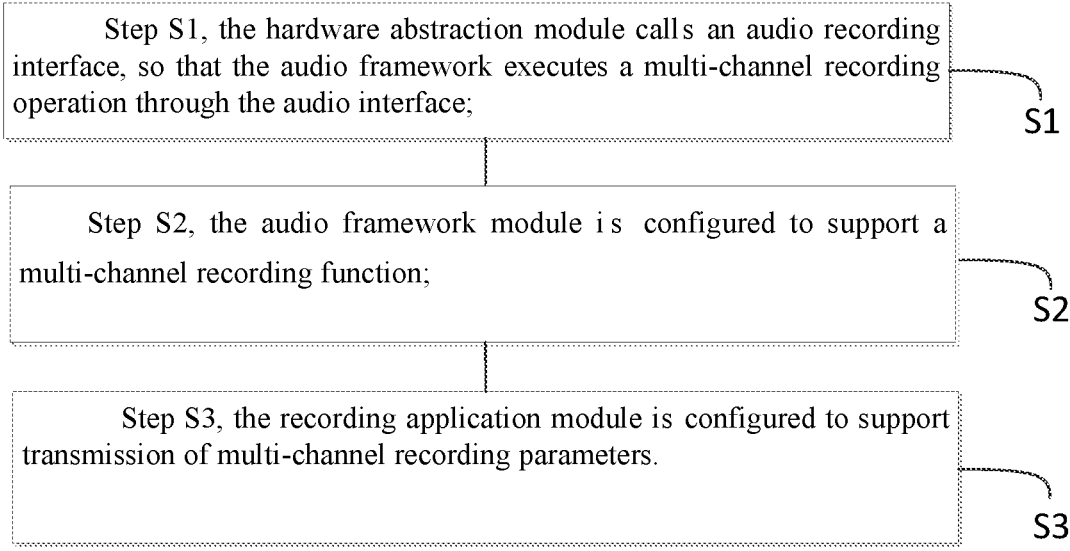
FIG. 1 is a flowchart of a method for realizing multi-channel recording based on an Android system according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, certain exemplary embodiments according to the present disclosure will be described with reference to the accompanying drawings.

The technical solution set forth in the present invention comprises a method for realizing multi-channel recording based on an Android system.

An embodiment of a method for realizing multi-channel recording based on an Android system, which is applicable to an audio system of an intelligent device based on the Android system, wherein the audio system sequentially comprises a recording application module, an audio framework module, an audio library, a hardware abstraction module and an audio driver module in a kernel, wherein as shown in FIG. 1, the method comprises following steps of:

Step S1, the hardware abstraction module calling an audio recording interface, so that the audio framework executes a multi-channel recording operation through the audio interface;

Step S2, the audio framework module being configured to support a multi-channel recording function; and Step S3, the recording application module being configured to support transmission of multi-channel recording parameters. For the prior art, the intelligent device based on Android system, such as mobile phones and tablets, only supports a single-channel of double-channel recording function. It means that the existing Android system cannot meet the user's need for a multi-channel and more professional recording function, as appropriate.

In this invention, the audio framework module in the audio system is configured to support the multi-channel recording function, then the audio interface is called such that a hardware device is started to execute the multi-channel recording operation. Afterwards, a recording file is acquired and the acquired recording file is transmitted via the recording application module. It should be noted that the hardware device herein refers to a microphone for audio recording.

The audio system specifically comprises following modules.

The recording application module is disposed at the uppermost level of the audio system.

The audio framework module provides another two classes, Audio Track and Audio Recorder, which have the similar function of Media Player and Media Recorder. The internal implementation of Media Player Service is made through the Audio Track and Audio Recorder. However, the Media Player and Media Recorder have more powerful control functions, and the Media Player and Media Recorder are easier to use.

In addition, the Android system also provides Audio Manager, Audio Service and Audio System for controlling the audio system. All of those classes are designed by the audio framework module for facilitating the development of upper-level applications.

Actually, many classes of the framework layer of the audio library are "media" through which applications use files in the Android library. Since the upper-level applications are written in java, the upper-level applications need the support of a java interface, and the presence of the framework layer is mainly for the above purpose.

As "media", many classes of the framework layer may not achieve specific functions, or may only achieve some functions. And the implementations are made in the library, to a large extent.

For example, the above-mentioned Audio Track, Audio Recorder, Media Player, and Media Recorder may find a corresponding class in the library.

Codes for Audio Track, Audio Recorder, Media Player, and Media Recorder are located at frameworks/av/media/libmedia in an engineer, and most of the codes are written in C++ language.

In addition to the implementation of the class library, the audio system also needs a "central control", that is, from the perspective of a common implementation, the audio system needs a system service (Service Manager, Location Manager Service, Activity Manager Service, etc.), namely, Audio Flinger and Audio Policy Service.

Codes for the Audio Flinger and the Audio Policy Service are placed at frameworks/av/services/audioflinger, and a main library produced is referred to as libaudiofinger.

Another important system service in the audio system is Media Player Service, which is located at frameworks/av/media/libmediaplayerservice.

A hardware abstraction layer of the hardware abstraction module is directly accessed by Audio Flinger.

It can be seen that Audio Flinger, on one hand, does not call the driving programs at the bottom level; on the other hand, modules on the upper layer of Audio Flinger (including the Media Player Service on the same layer) only needs to interact with it to implement audio-related functions.

Therefore, Audio Flinger can be taken as a real "separator" in the Android audio system. Even if modules at the below level changes, the implementation at the upper-level may keep compatible with the audio system.

The hardware abstraction layer is mainly divided into two parts, namely, Audio Flinger and Audio Policy Service. Audio Policy Service is not a real device, but a virtual device configured to allow the manufacturer to easily customize its own strategy.

The task of the abstraction layer is to associate the Audio Flinger/Audio Policy Service with the hardware device, but it must provide a flexible structure to handle the changes-especially for Android, an operating system which updates frequently.

Figure 2:
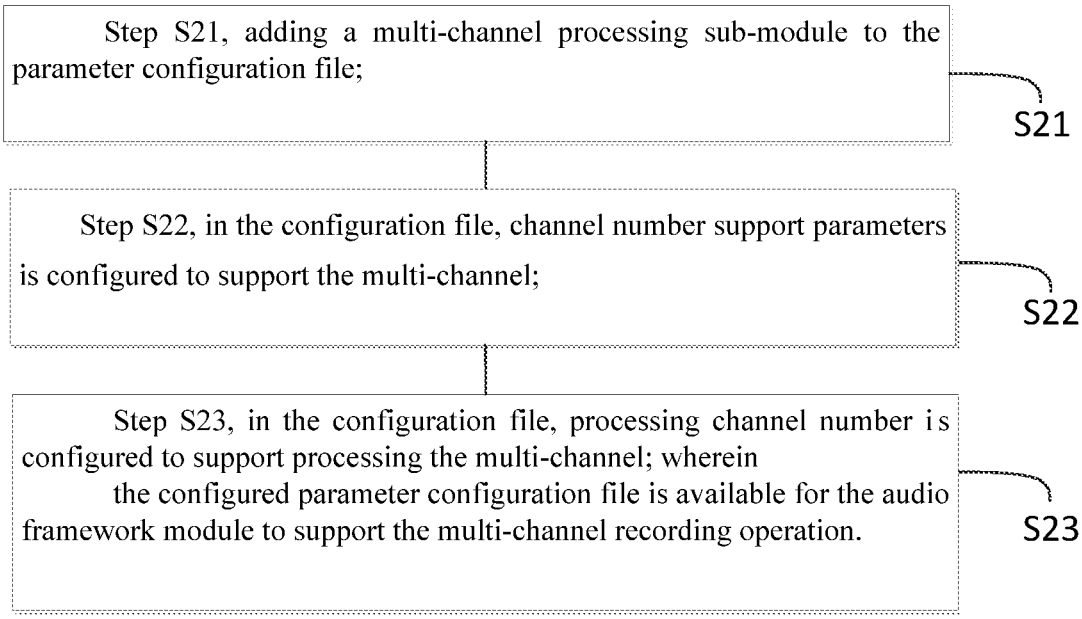
FIG. 2 is a flowchart of an embodiment of configuring an audio framework in a method for realizing multi-channel recording based on an Android system according to an embodiment of the present invention.

In a preferred embodiment, the audio framework module comprises a parameter configuration file, as shown in Step S2 in FIG. 2, a method for configuring the audio framework module comprises following steps of:

Step S21, adding a multi-channel processing sub-module to the parameter configuration file;

Step S22, in the configuration file, channel number support parameters being configured to support the multi-channel; and Step S23, in the configuration file, processing channel number being configured to support processing the multi-channel; wherein the configured parameter configuration file is available for the audio framework module to support the multi-channel recording operation.

In a preferred embodiment, the audio framework module comprises a hardware configuration file, and multi-channel configuration parameters are added to the hardware configuration file;

the configured hardware configuration file is available for a hardware device to support the multi-channel recording, so as to obtain multi-channel recording parameters.

In the above-mentioned technical solution, below is an embodiment, in which the multiple channels are 8 channels, and the specific configuration is as follows:

A. configuration system/media/audio/include/system/audio.h, a multi-channel macro (i.e., the multi-channel processing sub-module) definition is added to the file for calling for other places.

B. configuration a function of audio_channel in mask_from_count in system/media/audio/include/system/audio, increasing support for the 8 channels.

C. configuration frameworks/base/media/java/android/media/AudioFormat.java, adding the definition of the 8 channels.

D. configuration frameworks/base/media/java/android/media/AudioRecord.java, and processing the 8 channels in the Audio Record class.

E. configuration configuration file of audio_policy.conf, adding parameters of the 8 channels to the configuration of the main sound card.

In a preferred embodiment, the hardware configuration file is a configuration file of the main sound card.

In a preferred embodiment, the recording application module comprises an application configuration file, wherein in the application configuration file, the number for transmitting channel parameters is configured to support transmitting the multi-channel;

and the configured application configuration file is available for the recording application module to support the multi-channel recording parameters obtained through transmission.

In the above-mentioned technical solution, 8 channels are taken as an example for illustration, and configuration for the application module is detailed as follows:

A configuration packages/apps/SpeechRecorder/src/com/android/speechrecorder/MicrophoneInputStream.java, in a construction function of Microphone Input Stream, 8-channel parameters needs to be transferred in function of getting Min Buffer Size, and 8-channel parameters also needs to be transferred in function of create Audio Record B configuration packages/apps/SpeechRecorder/src/com/android/speechrecorder/S peechRecorderActivity.java, 8-channel parameters should be transferred when creating Wave Header.

In a preferred embodiment, in the application configuration file, a recording file in a predetermined format is created, and the recording file in a predetermined format is configured with multi-channel transmission parameters.

In the above-mentioned technical solution, the file in a predetermined format is Wave audio format.

In a preferred embodiment, the multi-channel comprises 8 channels.

An audio system is also provided in the technical solution of the present invention.

An embodiment of the audio system, the audio system is applicable to the above-mentioned method for realizing multi-channel recording.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for realizing multi-channel recording based on an Android system, which is applicable to an audio system of an intelligent device based on the Android system, wherein the audio system sequentially comprises a recording application module, an audio framework module, an audio library, a hardware abstraction module and an audio driver module in a kernel, wherein the method comprises following steps of:

Step S1, the hardware abstraction module calling an audio recording interface, so that the audio framework executes a multi-channel recording operation through the audio recording interface;

Step S2, the audio framework module being configured to support a multi-channel recording function; and Step S3, the recording application module being configured to support transmission of multi-channel recording parameters;

wherein the audio framework module comprises a parameter configuration file, wherein in Step S2, a method for configuring the audio framework module comprises following steps of:

Step S21, adding a multi-channel processing sub-module to the parameter configuration file;

Step S22, in the configuration file, channel number support parameters being configured to support the multi-channel; and Step S23, in the configuration file, processing channel number being configured to support processing the multi-channel; wherein the configured parameter configuration file is available for the audio framework module to support the multi-channel recording operation.

2. The method for realizing multi-channel recording as claimed in claim 1, wherein the audio framework module comprises a hardware configuration file, and multi-channel configuration parameters are added to the hardware configuration file; the configured hardware configuration file is available for a hardware device to support the multi-channel recording, so as to obtain multi-channel recording parameters.

3. The method for realizing multi-channel recording as claimed in claim 2, wherein the hardware configuration file is a configuration file of a main sound card.

4. The method for realizing multi-channel recording as claimed in claim 1, wherein the recording application module comprises an application configuration file, wherein in the application configuration file, the number for transmitting channel parameters is configured to support transmitting the multi-channel, and the configured application configuration file is available for the recording application module to support the multi-channel recording parameters obtained through transmission.

5. The method for realizing multi-channel recording as claimed in claim 4, wherein in the application configuration file, a recording file in a predetermined format is created, then the recording file in a predetermined format is configured with multi-channel transmission parameters.

6. The method for realizing multi-channel recording as claimed in claim 1, wherein the multi-channel comprises 8 channels.

7. An audio system, applicable to a method for realizing multi-channel recording based on an Android system, which is applicable to an audio system of an intelligent device based on the Android system, wherein the audio system sequentially comprises a recording application module, an audio framework module, an audio library, a hardware abstraction module and an audio driver module in a kernel, wherein the method comprises following steps of:

Step S1, the hardware abstraction module calling an audio recording interface, so that the audio framework executes a multi-channel recording operation through the audio recording interface;

Step S2, the audio framework module being configured to support a multi-channel recording function; and Step S3, the recording application module being configured to support transmission of multi-channel recording parameters;

wherein the audio framework module comprises a parameter configuration file, wherein in Step S2, a method for configuring the audio framework module comprises following steps of:

Step S21, adding a multi-channel processing sub-module to the parameter configuration file;

Step S22, in the configuration file, channel number support parameters being configured to support the multi-channel; and Step S23, in the configuration file, processing channel number being configured to support processing the multi-channel; wherein the configured parameter configuration file is available for the audio framework module to support the multi-channel recording operation.

8. The audio system as claimed in claim 7, wherein the audio framework module comprises a hardware configuration file, and multi-channel configuration parameters are added to the hardware configuration file;

the configured hardware configuration file is available for a hardware device to support the multi-channel recording, so as to obtain multi-channel recording parameters.

9. The audio system as claimed in claim 8, wherein the hardware configuration file is a configuration file of a main sound card.

10. The audio system as claimed in claim 7, wherein the recording application module comprises an application configuration file, wherein in the application configuration file, the number for transmitting channel parameters is configured to support transmitting the multi-channel, and the configured application configuration file is available for the recording application module to support the multi-channel recording parameters obtained through transmission.

11. The audio system as claimed in claim 10, wherein in the application configuration file, a recording file in a predetermined format is created, then the recording file in a predetermined format is configured with multi-channel transmission parameters.

12. The audio system as claimed in claim 7, wherein the multi-channel comprises eight channels.

* * * * *